US007219560B1

(12) United States Patent
Olivier et al.

(10) Patent No.: US 7,219,560 B1
(45) Date of Patent: May 22, 2007

(54) METHOD FOR DETERMINING AND CORRECTING FOR TURBINE METER OVERSPIN AT THE INSTANTANEOUS STOPPAGE OF FLOW RATE

(75) Inventors: Paul D. Olivier, Scottsdale, AZ (US); Frederick R. John, Scottsdale, AZ (US)

(73) Assignee: Flow Dynamics, Inc., Scottsdale, AZ (US)

( * ) Notice: Subject to any disclaimer, the term of this patent is extended or adjusted under 35 U.S.C. 154(b) by 242 days.

(21) Appl. No.: 11/002,928

(22) Filed: Dec. 2, 2004

(51) Int. Cl.
*G01F 1/05* (2006.01)
(52) U.S. Cl. .................................................. 73/861.79
(58) Field of Classification Search ................. 73/1.36, 73/861.79, 861.83, 861.84, 861.86, 861.87, 73/861.89, 861.77, 861.78; 702/46
See application file for complete search history.

(56) References Cited

U.S. PATENT DOCUMENTS 5,689,071 A 11/1997 Ruffner et al.
6,651,517 B1 11/2003 Olivier
6,692,535 B2 2/2004 Olivier

*Primary Examiner*—Robert Raevis
(74) *Attorney, Agent, or Firm*—Frank J. McGue

(57) ABSTRACT

A method of correcting for overspin in a turbine meter is provided. The turbine meter has turbine rotors positioned in a pipe in which liquid passes therethrough. The turbine rotors rotate in response to movement of the liquid passing through the pipe and sensors mounted proximate thereto count each passage of a rotor by providing an electronic pulse to a microprocessor. The microprocessor calculates the frequency of the electronic pulses which is directly proportional to the total quantity of liquid passing therethrough. If the microprocessor detects a rapid decrease in the frequency of the electronic pulses from the one or more sensors, it begins storing the frequency data therein. The microprocessor determines whether the decrease is due to a total shut off of liquid flowing or to a slow down of said flow. If a slowdown, the stored frequencies are used to compute the total quantity flowing through said pipe. If a shut down, the stored frequencies are deleted and not used to calculate total frequency.

6 Claims, 3 Drawing Sheets

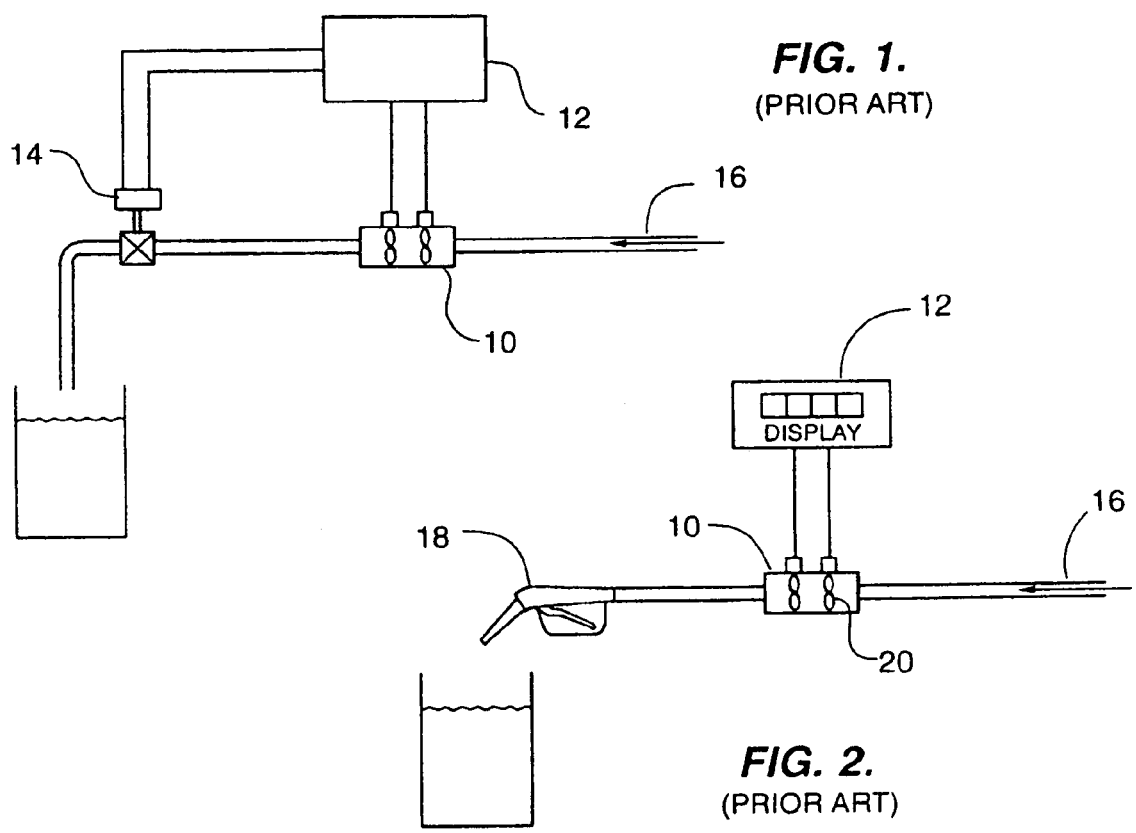
FIG. 1.
(PRIOR ART)
FIG. 2.
(PRIOR ART)
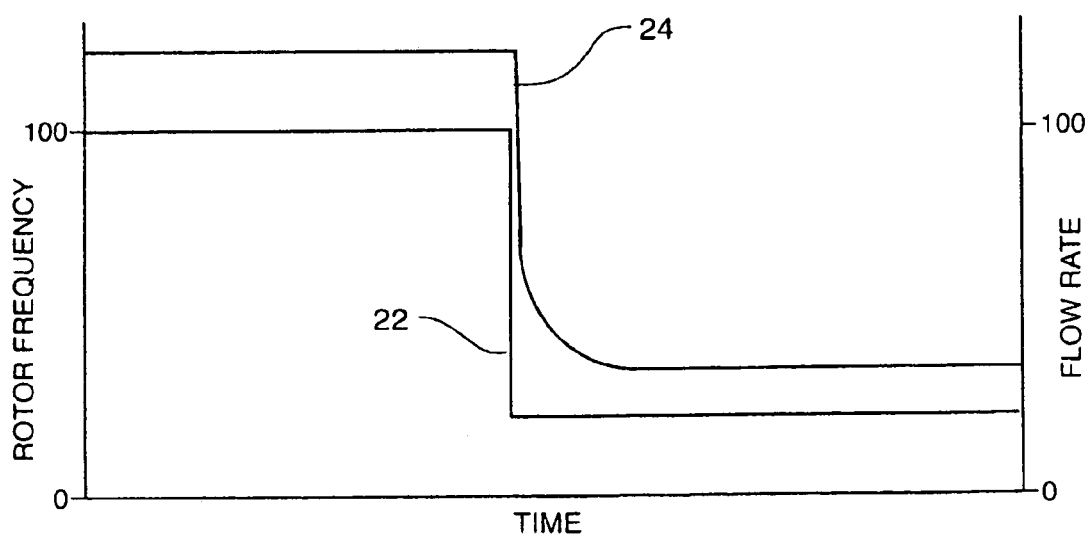
FIG. 3.
(PRIOR ART)

METHOD FOR DETERMINING AND CORRECTING FOR TURBINE METER OVERSPIN AT THE INSTANTANEOUS STOPPAGE OF FLOW RATE

TECHNICAL FIELD

This invention relates generally to the field of turbine meters, and, more particularly, to a method of correcting turbine meter overspin for a more accurate measurement of the liquid dispensed therethrough.

BACKGROUND OF THE INVENTION

Turbine flow meters are a very popular method of electronically measuring liquid flow. Inside such a meter, the flowing liquid in a conduit engages a rotor having a plurality of vanes causing it to rotate at a velocity which is directly proportional to the flow rate of said liquid. As the rotor rotates, a voltage is induced within a magnetic coil or a pulse is generated from an electronic sensor, both mounted outside the conduit each time a vane passes thereby creating an electronic pulse. Each pulse represents a distinct volume of liquid which passes between adjoining vanes.

As best seen in FIG. 1, when dispensing any liquid through a pipe 16 using a turbine meter 10, the usual procedure is to collect the electronic pulses and count, either up or down, until a desired quantity of liquid has passed through said turbine meter 10. At this time a microprocessor 12 in electronic communication with turbine meter 10 sends a signal to close a solenoid valve 14 ending the dispensing process. FIG. 1 shows this process schematically. Since the meter or system electronics are controlling the process the exact timing of opening and closing of solenoid valve 14 is included in this process, an accurate measurement of the liquid dispensed is easily attained.

However, when seeking a total quantity of liquid which passes through turbine meter 10 during a process in which the system is not controlling the flow rate or start and stop functions, turbine meter 10 must be able to respond almost instantly to the change in flow rate or starting or stopping of the flow without any anticipation as to when these events may occur. An example of an operation where the total quantity is sought is the emptying of one tank into another tank. The metering system does not control the process and must simply respond to the start of the operation, changing rates during the transfer, and the termination of flow when the supply tank is empty without any signals as to when these events may occur.

Another common example of an operation wherein the total amount of liquid passed through turbine meter 10 is the filling of a car's gasoline tank at a fueling station. When filling the tank of a car, the operation is manually controlled by the customer. The customer squeezes the handle of a fill nozzle 18 at his discretion, controls the flow rate by how far fill nozzle 18 is opened and shuts off fill nozzle 18 at his discretion or when the tank is full. Many customers "snap" the fill nozzle 18 several times in order to "top off" the tank, usually only adding a very small additional quantity of gasoline to the tank. Turbine meter 10 must be capable of responding almost instantly to these events in order to accurately compute the quantity of fuel transferred. FIG. 2 shows a schematic of such a typical configuration.

In turbine meter 10, prior to initiation of the flow process, the system is at rest. There is no axial (down the pipe) movement of the liquid. The one or more turbine rotors 20 are at rest, and no pulse output from turbine meter 10 is being sent to microprocessor 12. Now as control valve 14 is opened, the axial flow commences in pipe 16 and turbine rotors 20 begin to rotate in proportion to the rate of flow in the pipe. As turbine rotors 20 rotate, the fluid contained within turbine meter 10 also begins to rotate. Thus the fluid within and exiting from turbine rotors 20 of turbine meter 10 have both an axial component and a tangential or rotating component of velocity.

During flow acceleration, from zero to high flow rate, or from low to high flow rate, turbine rotors 20 and turbine meter 10 will respond almost instantly to changes in rate. The low inertia of the turbine rotors 20 compared to high driving momentum of the fluid cause turbine rotors 20 to respond within a few milliseconds to the change of flow rate. Thus an accurate representation of the instantaneous flow rate and an accurate total accumulated quantity of liquid passing through turbine meter 10 can be computed. At steady state flow rates, turbine meter 10 can also provide an accurate representation of the instantaneous flow rate and an accurate total accumulated quantity of liquid passing through turbine meter 10 can be computed.

When control valve 14 is slowly closed or controlled from one more open position to a lesser open condition, i.e.: going from a high flow rate to a lower flow rate, the inertia of turbine rotors 20, and hence a frequency of pulses 24 therefrom and the rotating fluid contained therewithin will accurately follow the change in rate as shown graphically in FIG. 3. The rate of change of flow rate 22 is less than the momentum of turbine rotors 20 and rotating fluid therewithin. During this condition, turbine meter 10 provides an accurate representation of the instantaneous flow rate and an accurate total accumulated quantity of liquid passing through turbine meter 10 can be computed.

When control valve 14 is instantly traversed from a wide open position to a nearly closed position, but flow rate 22 is not completely stopped, frequency 24 of turbine meter 10 responds accordingly. Frequency 24 of turbine rotor(s) 20 and rotating fluid contained within them is only slightly lagging the true flow rate 22 of the liquid. This occurrence happens over a few millisecond period and the error in the computation of instantaneous flow rate and the accurate total accumulated quantity of liquid passing through the meter is extremely small and within acceptable limits. FIG. 3 shows the typical frequency 24 decay of turbine rotors 20 and the "true" rate of change of flow rate 22 of the liquid.

However, when control valve 14 is instantly traversed from an open position to the fully closed position, completely stopping flow rate 22, the momentum of turbine rotors 20 and the fluid contained therewithin cause said turbine rotor to continue to spin in a decaying manner for a finite period of time. When control valve 14 is closed, the axial component of the velocity of the liquid in pipe 16 stops. However the rotating or tangential component of the velocity within turbine meter 10 results in turbine rotors 20 continuing to rotate until the viscous friction within the fluid causes the motion to stop. This condition is known as overspin. The decay rate is a logarithmic function and can take several seconds to completely stop. During this period, turbine meter 10 continues to send frequency pulses 24 to microprocessor 12 which indicates is treated as a continuing flow which results in a "false" increase in the total accumulated quantity passing through the meter. However, for an accurate measurement, these later frequency 24 pulses must not be included in a calculation of the rate or accumulated quantity as they do not represent an axial component or "true" flow or quantity passing through turbine meter 10.

While this error may be small relative to the total quantity of liquid, it is desirous to eliminate them from the computations.

Presently, users of turbine meters 10 will often instrument the valve with a switch or otherwise provide a signal to microprocessor 12 that control valve 14 is closed and thus any pulses generated by turbine meter 10 can be ignored. One solution of the prior art is illustrated in FIG. 4 which uses a microswitch 40 to provide said signal. When it is impractical to instrument the control valve, a flow switch 50 can be added to the system, as shown in FIG. 5, to provide a signal to microprocessor 12 to accomplish the same end.

U.S. Pat. No. 6,651,517 entitled "Fuel Dispensing System" which issued on Nov. 23, 2003 to Paul D. Olivier, the present inventor, describes one such solution to this problem. However, the instrumentation of the valve or the addition of a flow switch are expensive solutions to the problem. The flow switch has proven to a problematic solution. The reliability of the flow switch is significantly less than that of the turbine meter thereby diminishing the system reliability while increasing the system cost.

Thus, there is a need for an alternate method to accurately measure the flow rate when going from an open to a fully closed valve.

The present invention meets this need.

SUMMARY OF THE INVENTION

It is an object of this invention to provide an turbine meter which provides improved accuracy over current turbine meter systems.

It is a further object of this invention to provide improved accuracy to a turbine meter which employs a software solution to the problem.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawings in which:

FIG. 1 is a schematic view of a liquid dispensing system of the prior art;

FIG. 2 is a schematic view of a fuel dispensing system of the prior art;

FIG. 3 is a graph showing the known relationship between flow rate and rotor frequency when going from a high flow rate to a lower flow rate;

DESCRIPTION OF THE PREFERRED EMBODIMENT

Figure 4:
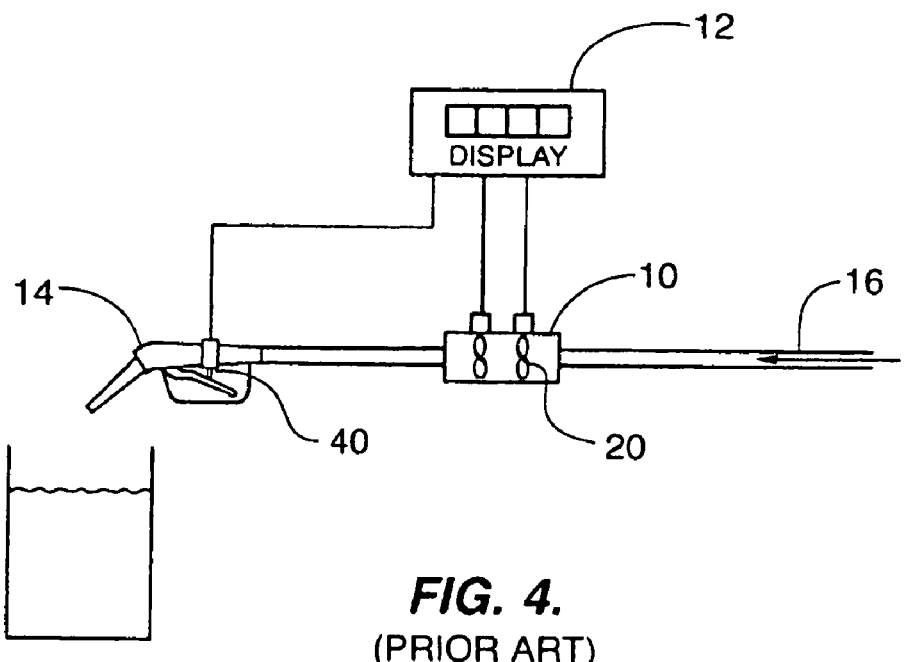
FIG. 4 is a schematic showing a fuel dispensing system of the prior art using a microswitch to improve accuracy.
Figure 5:
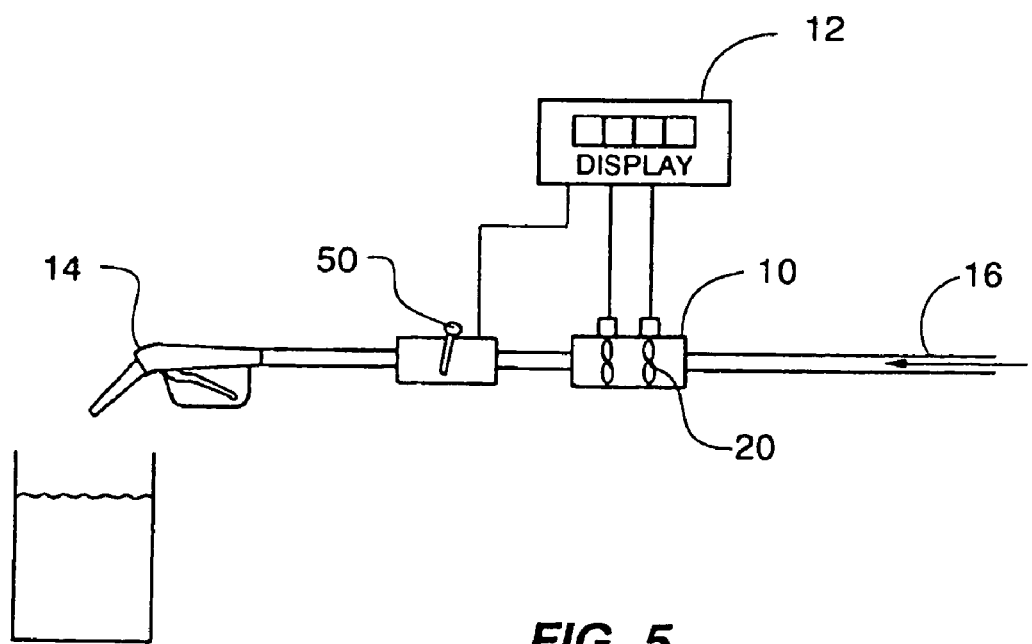
FIG. 5 is a schematic showing a fuel dispensing system of the prior art using a flow switch to improve accuracy.

A software solution within an existing turbine meter microprocessor 12 that is capable of detecting the difference between a partial closure of control valve 14 and a full closure of control valve 14 is an ideal solution to the problem. Microprocessor 12 is capable of detecting a rapid deceleration (decreasing change of rotor frequency) of the rotor(s). Typical microprocessor 12 speeds and rotor blade passing frequencies 24 are sufficient to detect the occurrence of a rapid deceleration within 1–2 milliseconds and compute the rate of deceleration within another 1 microsecond.

Once the rapid deceleration is detected, one of two future conditions will occur. A lower steady state flow rate 22 will stabilize within a fraction of a second, which is a valid condition, or the flow rate 22 has been stopped and turbine rotors 20 are continuing to spin (over spin) when no flow is present, which is an invalid condition.

When microprocessor 12 detects the rapid deceleration, said microprocessor is programmed to keep track of each future computation period until a decision is made as to which of the two conditions has occurred. If control valve 14 is still partially open and a low valid flow rate 22 is present, microprocessor 12 will add back in the quantity of liquid accumulated during each computation period. If, on the other hand, control valve 14 is closed and turbine rotors 20 are overspinning, the quantity of liquid accumulated during each computation period is dropped (not added into the total quantity) and the displayed or retained quantity is correct.

The total contained in each computational period is described in U.S. Pat. No. 6,651,517 entitled "Fuel Dispensing System" which issued on Nov. 23, 2003 to Paul D. Olivier, the present inventor and is herein incorporated by reference.

The present invention describes methods of determining appropriate condition of control valve 14, whether a lower flow rate 22 or completely shut. The most direct solution to this decision is to assume that if flow rate 22 hasn't stopped it is a valid condition. The method of detecting the stopped flow condition can be one or more of the following conditions.

First, as those skilled in the art will recognize, all turbine meter applications have a minimum flow rate 60 that is relevant for that application. A zero flow rate is not a practical "trigger" point. No flow meter 10 can operate accurately at or near zero flow rate. Thus, the operator selects a flow rate as the minimum rate 60 that is just below any valid rate.

Figure 6:
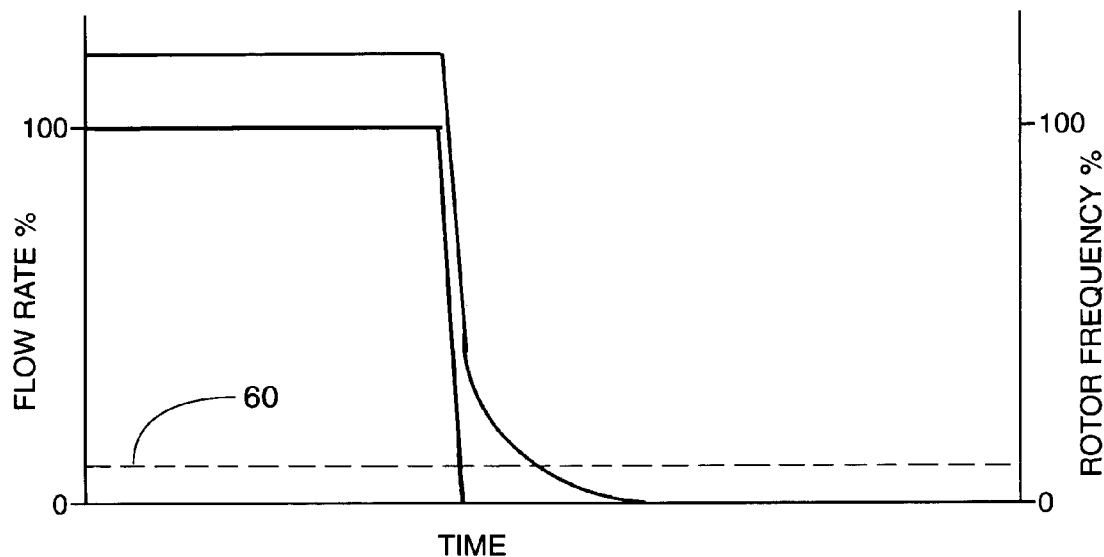
FIG. 6 is a graph showing the known relationship between flow rate and rotor frequency when going from a high flow rate to a zero flow rate illustrating one method for correcting the accuracy problem of the prior art.

In the example of gasoline dispenser, as best seen in FIG. 6, hand operated fill nozzle 18 has a minimum opening that can be maintained which results in minimum useable flow rate frequency 60. If fill nozzle 18 is moved any closer to closure than this position, fill nozzle 18 will snap shut. This characteristic is designed to prevent flow rates 22 lower than turbine meter 20 can accurately measure from be set. Thus, if a flow rate 22 lower than minimum flow rate 60 is detected, it can be assumed that the "true" flow rate 22 is zero and that turbine meter 10 is in the overspin condition. All of the quantities from the accumulated periods are discarded, and the stored total is presented.

For a conventional single rotor turbine meter 10, this is probably the only valid method and is illustrated in FIG. 6.

However, for a dual rotor turbine meter 10 such as described in U.S. Pat. No. 5,689,071 entitled "Wide Range, High Accuracy Flow Meter" which issued on Nov. 18, 1997 to inventors Donald F. Ruffner and present applicant Paul D.

Olivier describe a dual rotor turbine meter which contains two counter-rotating rotors in close proximity. When this technique is applied to dual rotor turbine meter 10, additional information can be obtained to aid in the decision process as to whether or not the flow has been stopped.

Figure 7:
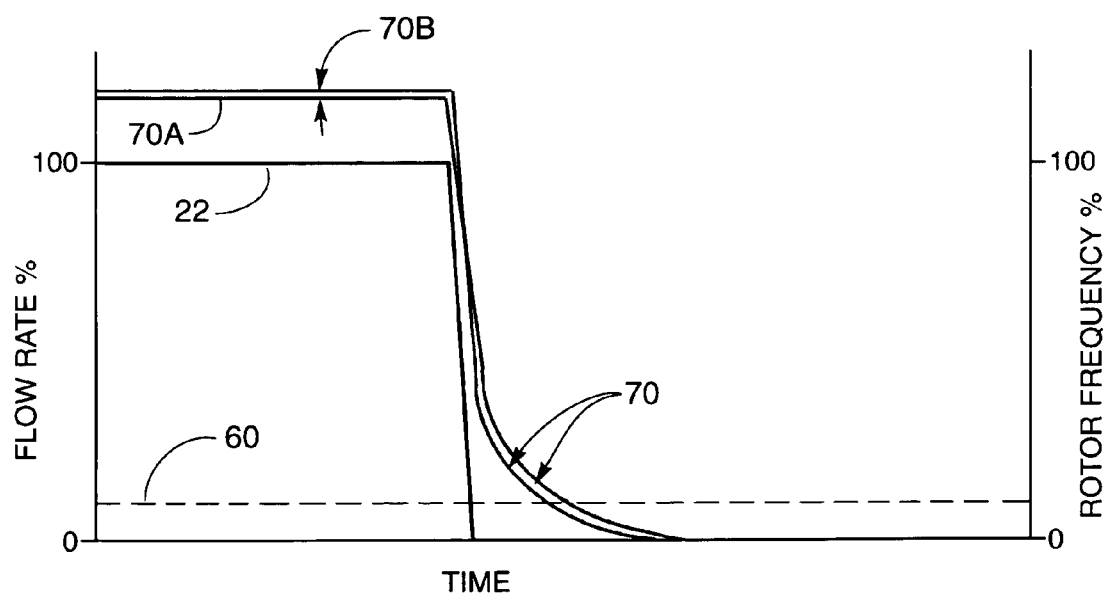
FIG. 7 is a graph showing the an alternate resolution of the accuracy problem when going from a high flow rate to a zero flow rate.

During normal operation, namely, when a valid flow rate 22 is present, the two counter-rotating elements 20A and 20B rotate at two distinct frequencies 70A and 70B, respectively, which have a defined frequency relationship illustrated in FIG. 7. For any flow rate 22 and liquid viscosity and temperature, the frequency relationship 70A/70B is a constant. Over the entire operating range of flow rate, viscosity and temperature, the frequency relationship changes over a limited range but is fixed at each individual set of conditions. During a rapid deceleration, when flow rate 22 actually exists, this relationship 70A/70B remains within the normal range. However, when flow rate 22 is stopped, the frequency relationship 70A/70B shifts to an invalid relationship (frequency ratio). Once an invalid frequency ratio is detected, it can be assumed that zero flow rate 22 must exist. This phenomenon can also be used in conjunction with the minimum flow rate 60 to conclude that zero flow rate 22 must exist.

The method of computation of the flow rate 22 and quantity for each period is shown. As the flow rate 22 is reduced rapidly, the quantity of fluid collected for each period diminishes. Once a rapid deceleration is detected, the quantities for each subsequent period is stored in memory and not added to the previously accumulated total. If a zero flow rate determination is not concluded by one or both of the above methods, then a valid new lower flow rate must exist and the quantities for each of these subsequent periods is added to the previously accumulated total and the accumulation of quantities continues until another occurrence is observed. If a zero flow rate determination is concluded, the stored quantities for each period are discarded and not included in the accumulated total. The current accumulated total is presented or stored as the final accumulated total.

Although only certain embodiments have been illustrated and described, it will be apparent to those skilled in the art that various changes and modifications may be made therein without departing from the spirit of the invention or from the scope of the appended

What is claimed is:

1. A method of correcting for overspin in a turbine meter, the turbine meter having one or more turbine rotors positioned in a pipe having a liquid passing therethrough, the one or more turbine rotors rotating in response to movement of the liquid passing through the pipe, the turbine meter having one or more sensors mounted proximate to and corresponding to each of the one or more turbine rotors, each of the one or more sensors providing an electronic pulse when the corresponding one or more turbine rotors passes thereby, each pulse representing a distinct volume of liquid which passes between the one or more turbine rotors, the method comprising the steps of:

providing a microprocessor capable of detecting a rapid change of the frequency of the electronic pulses from the one or more sensors, the microprocessor calculating the frequency of the electronic pulses and thereby the total quantity of liquid passing therethrough;

detecting a rapid decrease in the frequency of the electronic pulses from the one or more sensors;

storing the frequencies of the rapidly decreasing electronic pulses in the microprocessor;

determining whether a lower frequency steady state flow rate is reached and, if so, calculating from the stored frequencies the quantity of liquid to the total quantity of liquid passing therethrough; and, if not, deleting the stored frequencies from the microprocessor.

2. The method according to claim 1 wherein the microprocessor is capable of detecting a rapid deceleration within 1–2 milliseconds.

3. The method according to claim 1 wherein the step of determining whether a lower frequency steady state flow rate is reached further comprises the steps of:

selecting a minimum frequency corresponding to a minimum flow rate for the turbine meter for a minimum for the lower frequency steady flow rate.

4. The method of claim 3 wherein having one turbine rotor and one sensor.

5. The method of claim 1 wherein having two counter-rotating turbine rotors and two sensors corresponding thereto.

6. The method according to claim 5 wherein the step of determining whether a lower frequency steady state flow rate is reached further comprises the steps of:

determining the frequencies of each of the two turbine rotors;

determining the frequency relationship between the frequencies of the two turbine rotors;

measuring the frequency relationship continuously and detecting if the measured frequency relationship differs from the determined frequency relationship, and, if not, adding the stored frequencies the resultant quantities to the total quantity of liquid passing therethrough; and, if so, deleting the stored frequencies from the microprocessor.

\* \* \* \* \*